United States Patent [19]
Morris et al.

[11] Patent Number: 5,673,148
[45] Date of Patent: Sep. 30, 1997

[54] ENCAPSULATED RETROREFLECTIVE ELEMENTS AND METHOD FOR MAKING SAME

[75] Inventors: Geoffrey P. Morris, White Bear Lake; Kenton D. Budd, Woodbury, both of Minn.

[73] Assignee: Minnesota Mining and Manufacturing Company, St. Paul, Minn.

[21] Appl. No.: 264,729

[22] Filed: Jun. 23, 1994

[51] Int. Cl.$^6$ .......................... G02B 5/128; G02B 5/122
[52] U.S. Cl. .......................... 359/536; 359/529; 359/530; 359/538; 359/539; 359/541
[58] Field of Search .................... 359/529, 530, 359/534–541; 428/285

[56] References Cited

U.S. PATENT DOCUMENTS

| | | | |
|---|---|---|---|
| 2,366,516 | 1/1945 | Geffcken et al. | 117/124 |
| 2,713,286 | 7/1955 | Taylor . | |
| 2,963,378 | 12/1960 | Palmquist et al. | 106/193 |
| 3,025,764 | 3/1962 | McKenzie . | |
| 3,228,897 | 1/1966 | Nellessen | 260/16 |
| 3,251,704 | 5/1966 | Nellessen | 106/193 |
| 3,420,597 | 1/1969 | Nellessen et al. . | |
| 3,535,019 | 10/1970 | Longlet et al. . | |
| 3,700,305 | 10/1972 | Bingham . | |
| 3,709,706 | 1/1973 | Sowman | 106/57 |
| 3,835,087 | 9/1974 | Searight et al. | 260/33.6 R |
| 4,263,345 | 4/1981 | Bingham | 427/163 |
| 4,469,645 | 9/1984 | Eigenmann | 264/1.6 |
| 4,703,999 | 11/1987 | Benson . | |
| 4,855,189 | 8/1989 | Simopoulos et al. | 428/690 |
| 5,156,885 | 10/1992 | Budd | 427/70 |
| 5,338,595 | 8/1994 | Li | 359/540 |

FOREIGN PATENT DOCUMENTS 877 083  9/1961  United Kingdom .

*Primary Examiner*—James Phan
*Attorney, Agent, or Firm*—Gary L. Griswold; Walter N. Kirn; Robert H. Jordan

[57] ABSTRACT

Encapsulated retroreflective element comprising a retroreflective assembly made up of a transparent optical body and a reflective member and essentially completely encapsulated within a dense, substantially transparent oxide coating. Also a method for making such retroreflective elements and articles and compositions comprising such retroreflective elements.

19 Claims, 1 Drawing Sheet

ENCAPSULATED RETROREFLECTIVE ELEMENTS AND METHOD FOR MAKING SAME

FIELD OF INVENTION

The present invention relates to retroreflective elements, e.g., glass microspheres with hemispheric specular reflectors thereon. The present invention also relates to liquid coating compositions and articles made with such retroreflective elements and to a method for making such retroreflective elements.

BACKGROUND

Liquid coating compositions that can be used to provide, in simple fashion, a retroreflective coating on a desired substrate such as a sign or an article of clothing are well known. These compositions are sometimes referred to as "retroreflective liquids", "retroreflective inks", or "retroreflective paints".

U.S. Pat. No. 2,963,378 (Palmquist et al.) discloses a coating composition comprising hemispherically reflectorized microspheres, film forming binder material, and solvent. U.S. Pat. No. 3,251,704 (Nellessen) discloses similar compositions that additionally contain pigment particles. U.S. Pat. No. 4,263,345 (Bingham) discloses similar compositions intended for use on fabrics and garments. It notes at column 4, lines 53–62, that "barrier films", such as aluminum phosphate or aluminum oxide films, may be applied over a metal hemispheric coating in the manner taught in Longlet et al., U.S. Pat. No. 3,535,019 to increase the shelf-stability of compositions of the invention. Such coatings have yielded coating compositions with undesirably short shelf lives, i.e., on the order of several days or a few weeks.

U.S. Pat. No. 3,535,019 (Longlet et al.) discloses treatment of microspheres with aluminum hemispheric metal specular reflectors to form a barrier film over the specular reflector, e.g., film of an aluminum phosphate formed from reaction of an aluminum specular reflector with an aqueous solution of ammonium dihydrogen phosphate or a film of an aluminum oxide formed from reaction of an aluminum specular reflector with sodium dichromate. Such protective coatings can be referred to as "reactive" or "reactively-formed" because they are formed in situ via reaction of the hemispheric reflectors. Such coatings are limited in that they can be formed only on reflectors that can react with suitable reactants and only cover the reflector and not the remaining portions of the retroreflective element, e.g., the front surface of the microsphere. Also, if the reaction is carried out in an aqueous solution, the specular reflective layer may be degraded by the solution in addition to being partially consumed in the reaction that forms the protective layer. Moreover, the coatings formed via this technique are relatively hydrous and do not provide desired protection for retroreflective compositions.

Due to the rapid hydrolysis of aluminum when it comes into contact with water or corrosive agents, previously known liquid coating compositions containing hemispherically reflectorized microspheres made with aluminum have been plagued by undesirably short shelf lives, i.e., just several days or a few weeks. The aluminum reflectors are degraded by the water in the vehicle, thereby reducing their effectiveness once the composition is applied and a retroreflective coating formed. Silver reflectors suffer a similar form of degradation, albeit typically to a lesser degree. Accordingly, water-based compositions for forming retroreflective coatings are often packaged in two part form. Due to environmental and safety concerns, as well as ease of use and clean up, water-based liquid coating compositions are considered more desirable than compositions containing organic solvents. Due to cost of manufacture and use and for reasons of convenience, liquid coating compositions with long shelf lives are desirable.

SUMMARY OF INVENTION

The present invention provides novel encapsulated retroreflective elements having thin, substantially transparent protective coatings which exhibit unexpected durability, especially when exposed to aqueous or corrosive liquids or environments. The present invention also provides liquid coating compositions and articles made with such retroreflective elements as well as providing a novel method for making such encapsulated retroreflective elements.

Briefly summarizing, encapsulated retroreflective elements of the invention each comprise a retroreflective assembly comprising a transparent optical body and a reflective member wherein the retroreflective assembly is essentially completely encapsulated within a deposited dense, i.e., substantially hermetic, transparent continuous oxide coating as described herein. By "dense or hermetic", it is meant that the coating is continuous and impermeable to water.

In brief summary, the novel method of the invention comprises:
a) providing an agitated bed of a plurality of retroreflective assemblies; and
b) exposing the bed to one or more vapor phase materials such that dense or hermetic, substantially transparent oxide coatings are deposited on the surfaces of the retroreflective assemblies substantially individually encapsulating the retroreflective assemblies;

thereby yielding encapsulated retroreflective elements of the invention. Illustrative examples include chemical vapor phase deposition processes (sometimes referred to as "CVD" processes) wherein vapor phase precursor materials react and form deposited coatings on the surfaces of the assemblies, reactive sputtering processes, and vacuum sputtering processes.

Briefly summarizing, liquid coating compositions of the invention comprise (1) a coating vehicle comprising a film-forming binder material and a liquid volatilizing agent, (2) a plurality of encapsulated retroreflective elements as described herein, and optionally (3) other components such as pigment particles.

The encapsulated retroreflective elements described herein exhibit improved durability when exposed to water or corrosive agents or environments such as when liquid coating compositions for forming retroreflective coatings on substrates are formed. As a result, single package water-based liquid coating compositions with long shelf life can be prepared, thereby achieving substantial environmental, cost, and convenience advantages.

BRIEF DESCRIPTION OF DRAWING

The invention will be further explained with reference to the drawing, wherein.

These figures are idealized and are intended to be merely illustrative and non-limiting.

DETAILED DESCRIPTION OF ILLUSTRATIVE EMBODIMENTS

Figure 1:
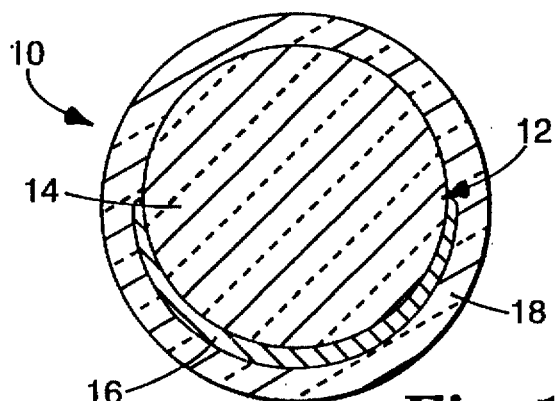
FIG. 1 is a cross-sectional illustration of an illustrative retroreflective element of the invention.

As shown in FIG. 1, encapsulated retroreflective elements of the invention 10 each comprise retroreflective assembly 12 comprising optical body 14 and reflective member or reflector 16 shown here covering a portion of the surface of optical body 14. Retroreflective assembly 12 is essentially completely encapsulated within dense, substantially transparent oxide coating 18.

The most typical kind of optical bodies used in the invention are transparent microspheres. Such optical bodies typically provide satisfactory levels of retroreflective brightness over a wide range of incidence angles, i.e., the angles at which light strikes the resultant retroreflective article, a property sometimes referred to as "angularity". Accordingly they are well-suited for use in applications where it is difficult or impossible to orient the retroreflective elements, such as is the case with retroreflective coatings formed from liquid coating compositions where the elements are typically randomly oriented. However, optical bodies of other configurations may be used in accordance with the teachings of this invention if desired, for example, cube-corner retroreflective elements or gloguides. Illustrative cube corner retroreflective assemblies with aluminum reflective members are disclosed in U.S. Pat. No. 4,703,999 (Benson). Illustrative gloguides are disclosed in U.S. Pat. No. 4,469,645 (Eigenmann).

When microspheres are used as optical bodies, the microspheres are preferably substantially spherical in shape in order to provide the most uniform and efficient retroreflection.

Typically, the optical bodies are preferably substantially transparent so as to minimize the amount of light absorbed by the retroreflective element and thereby maximize the amount of incident light which is retroreflected by retroreflective articles of the invention.

Microspheres used herein may be made of glass or synthetic resin having the desired optical properties and physical characteristics. Glass microspheres are typically preferred because they typically cost less, are harder, exhibit superior durability, and provide better optical efficiency than polymeric microspheres.

Microspheres used in liquid coating compositions to be used on fabrics and clothing will typically have an average diameter between about 25 and about 150 microns. Coatings made with substantially larger microspheres may tend to be thicker and less flexible than desired whereas coatings made with substantially smaller microspheres may tend to be less bright, i.e., provide less retroreflection, because of diffraction losses as the diameter of the microspheres approaches the wavelength of the light being retroreflected. For such applications, the average diameter of the microspheres is typically preferably between about 25 and 75 microns. It will be understood, however, that microspheres of other dimensions may be useful, and in some instances even preferred, for other applications of the invention. Typically it is preferred that the microspheres be of substantially uniform diameters thereby enabling more uniform control of the fabrication of the retroreflective assemblies, retroreflective elements, and ultimate article, as well as more uniform appearance and performance of the ultimate article (substrate with a retroreflective coating thereon such as an article of clothing with a retroreflective graphic).

Microspheres having an index of refraction between about 1.4 and 2.7 are typically useful in the present invention, with those having an index of refraction between about 1.8 and 2.0 typically being preferred, and those having an index of refraction between about 1.90 and 1.95 typically being more preferred, especially for coatings to be used in environments where the front surfaces of the retroreflective elements will have an air interface. In those instances where the front surfaces of the retroreflective elements are likely to be wet with water when retroreflection is desired, the microspheres will preferably have a higher index of refraction, i.e., about 2.5.

The optical bodies may be substantially colorless or colored, e.g., with dyes or other coloring agents incorporated into the optical body, as desired. If desired, a combination of colorless and colored optical bodies may be used.

When the optical body is a microsphere, the reflective member is a coating, typically substantially hemispherical, on the surface of each microsphere. The angularity of retroreflection of an individual microsphere is typically greatest when the microsphere is essentially hemispherically covered by the specularly reflective member. Typically brighter retroreflective performance is obtained when the reflective member is aluminum or silver. Silver reflective members typically provide somewhat brighter performance but aluminum reflective members are typically somewhat more durable. If desired, dielectric reflectors such as are disclosed in U.S. Pat. No. 3,700,305 (Bingham) may be used. Such reflective members are known to be useful for achieving truer, more brilliant daytime or ambient color than are those with aluminum or silver reflective members. However, typically dielectric coatings (e.g., alternating layers of zinc sulfides, cryolite, etc.) are soluble or readily degraded in water, making them previously of limited utility for use in water-based liquid coating compositions or in retroreflective articles (e.g., graphic designs on clothing) that are laundered or exposed to acidic environments.

The retroreflective assembly of each retroreflective element of the invention is essentially completely encapsulated within a dense, continuous, water-impermeable, preferably substantially transparent oxide coating. As used herein, "oxide coating" means a material made up primarily of metal or metalloid cations and oxygen, but which may contain minor amounts of other elements and compounds originating in the precursor materials or reflective assemblies, which can be generated in coating form on reflective assemblies as described herein. For instance, coatings of titania ($TiO_2$), titania/silica ($TiO_2$)/($SiO_2$), alumina ($Al_2O_3$), silica, tin oxide ($SnO_2$), zirconia ($ZrO_2$), etc., and mixed oxides are believed useful herein. Typically the protective coating is one of the following: titanium dioxide, silicon dioxide, aluminum oxide, or a combination thereof. Some are more preferred for particular applications than others. For instance, alumina coatings are more resistant in acidic conditions than in water or basic conditions where they exhibit a greater tendency to degrade. Silica coatings tend to degrade under strongly basic conditions. Titania and titania/silica coatings are most preferred as they are readily deposited and form coatings that are durable under acidic and basic conditions as well as in neutral water. Generally, dense or hermetic coatings of these and other oxides can be deposited by known vapor deposition methods. The choice of the composition depends in part upon the ability to deposit a sufficiently dense protective coating by a sufficiently convenient deposition method and on the properties desired of the resultant coating. Coatings deposited at relatively low temperatures may tend to be more amorphous in character.

Titania and titania/silica coatings are typically preferred because durable hermetic coatings can be readily deposited at low temperatures by hydrolysis-based chemical vapor deposition. Hermetic alumina coatings can also be deposited by hydrolysis-based chemical vapor deposition but may tend to be less chemically durable and may even be subject to degradation by water.

As mentioned above, coatings of the invention may also be deposited via reactive sputtering processes and vacuum sputtering processes. By "deposited" it is meant that essentially all of the material of the coating is added to the surface of the reflective assembly during fabrication of the coating. In distinction, in "reactive" coatings such as are disclosed in the aforementioned U.S. Pat. No. 3,535,019 a major fraction or component of the resultant coating is derived or obtained from the reflective assembly itself, e.g., aluminum from the specular reflective layer.

Coatings formed in accordance with the invention are typically quite smooth so as to be optically clear. They are typically tough and are not easily chipped or flaked, thereby providing durable protection to the encapsulated retroreflective element.

Typically the oxide coating is between about 100 and about 10,000 Angstroms (0.01 and 1 micron), preferably between about 300 and about 5000 Angstroms (0.03 and 0.5 microns) thick. Coatings which are too thin may tend to provide insufficient protection from corrosion. Coatings which are too thick may tend to be less transparent and/or exhibit more light scattering, thus resulting in reduced retroreflective brightness by the resultant retroreflective element. Coatings of the invention typically have less than 5 percent open porosity, i.e., they are impermeable to water.

In brief summary, a novel method for making retroreflective elements of the invention comprises:

a) providing an agitated bed of a plurality of retroreflective assemblies; and b) exposing the bed to one or more vapor phase materials such that dense, substantially transparent oxide coatings are deposited on the surfaces of the retroreflective assemblies substantially individually encapsulating the retroreflective assemblies;

thereby yielding encapsulated retroreflective elements of the invention. In general, the processes used herein can be collectively referred to as "vapor deposition processes" in which the coating is deposited on the surface of the retroreflective assembly from a vapor form to yield the desired oxide coating. In some embodiments, vapor phase precursor materials are mixed in proximity to the retroreflective assemblies and chemically react in situ to form the coating material which is deposited as the coating of the invention. In other embodiments, the coating material is presented in vapor form and deposits on the surface of the retroreflective assembly to form the coating of the invention with essentially no chemical reaction. Typically it will be preferred to utilize a so-called "chemical vapor deposition" process. More preferably a low temperature, atmospheric pressure chemical vapor deposition process ("APCVD") is used. Such processes do not require vacuum systems, can provide high coating rates, and minimize degradation to the retroreflective assembly during coating. Hydrolysis-based APCVD is most preferred because of the ability to obtain highly hermetic coatings at low temperatures, e.g., typically well below 300° C.

Formation of microspheres with a reflective member (e.g., covering a portion of the surface of the microsphere with a hemispheric reflective coating such as aluminum or silver) is well known.

If desired, the hemispheric reflective coating may have a protective barrier layer formed thereon prior to encapsulating the retroreflective assembly in accordance with the invention. For instance, as discussed above, U.S. Pat. No. 3,535,019 discloses formation of reactive coatings on reflective coatings, e.g., aluminum phosphate or aluminum oxide coatings formed on aluminum reflectors. A surprising aspect of the present invention, however, is that such protective barrier layers are not necessary. Reflective coatings such are aluminum are not degraded during the encapsulation process as would have been expected.

Uncoated retroreflective assemblies are placed in a reaction chamber and heated to an appropriate temperature to achieve the desired deposition of a protective layer. For example, a number of deposition process known for use on electroluminescent phosphor particles may be used if desired. Illustrative processes are disclosed in U.S. Pat. No. 5,156,885 (Budd) which discloses a relatively low temperature deposition process and in U.S. Pat. No. 4,855,189 (Simopoulos et al.) which discloses a relatively higher temperature deposition process. In some instances, coating at high temperatures may result in degradation of the retroreflective assembly, e.g., polymeric optical bodies or some reflective layers, and yield encapsulated retroreflective elements with somewhat degraded retroreflective brightness. As will be understood, selection of a suitable process for deposition of a coating in accordance with the invention will be dependent in part upon the nature of the retroreflective assembly and its component members.

In order to form substantially continuous coatings covering essentially the entire surfaces of the retroreflective assemblies, the assemblies are preferably agitated while in the deposition chamber. Illustrative examples of useful methods for agitating the assemblies include shaking, vibrating, or rotating the reactor, stirring the assemblies, or suspending the assemblies in a fluidized bed. By agitating the assemblies, essentially the entire surface of each assembly is exposed during the deposition, and the assembly and reaction precursors or coating material may be well intermixed, so that substantially uniform and complete encapsulation of each retroreflective assembly is achieved. Typically, a preferred deposition chamber is a fluidized bed reactor. Fluidizing typically tends to effectively prevent agglomeration of the assemblies, achieve uniform mixing of the assemblies and reaction precursor materials, and provide more uniform reaction conditions, thereby resulting in highly uniform encapsulation characteristics.

Although not required in many instances, it may be desired when using assemblies which tend to agglomerate to coat the assemblies with fluidizing aids, e.g., small amounts of fumed silica, precipitated silica, VOLAN™ a macromic phthacro complex from E. I. DuPont De Nemours, etc. Selection of such aids and of useful amounts thereof may be readily determined by those with ordinary skill in the art.

Depending upon the deposition process being used, precursor materials (in the case of a reaction-based deposition process) or coating material (in the case of a non-reaction-based process), typically in vapor phase, are placed in the deposition chamber with the retroreflective assemblies. The present invention preferably utilizes a vapor phase hydrolysis reaction to deposit a coating of oxide material on the surfaces of the retroreflective assemblies thereby encapsulating them. Such process is sometimes referred to as a chemical vapor deposition ("CVD") reaction. The following is an illustrative reaction:

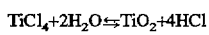

In the illustration, water vapor and titanium tetrachloride are considered oxide precursor materials.

One technique for getting the precursor materials into vapor phase and adding them to the reaction chamber is to bubble a stream of gas, preferably inert, referred to herein as a carrier gas, through a solution or neat liquid of the precursor material and then into the reaction chamber. Illustrative examples of inert gases which may be used herein include argon and nitrogen. Oxygen and/or dry air may also be used. An advantage of this technique is that the carrier gas/precursor streams may be used to fluidize the retroreflective assemblies in the reaction chamber, thereby facilitating the desired encapsulation process. In addition, such a technique provides means for readily controlling the rate of introduction of the precursor materials into the reactor.

Figure 4:
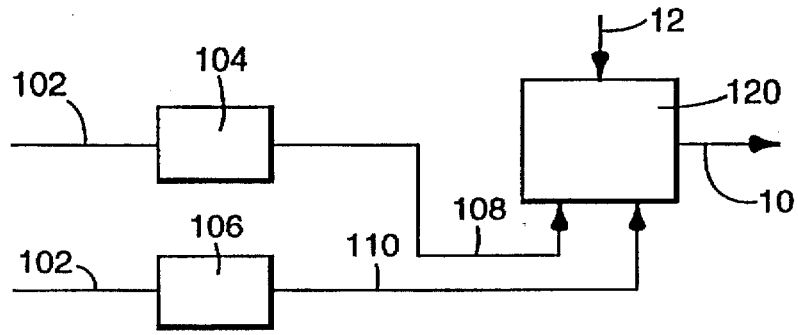
FIG. 4 is a block diagram of an illustrative process embodiment of the invention.

Referring to FIG. 4, wherein an illustrative process of the invention is shown, carrier gas 102 is bubbled through water bubbler 104, to produce water Vapor-containing precursor stream 108, and carrier gas 102 is also bubbled through titanium tetrachloride bubbler 106, to produce titanium tetrachloride-containing precursor stream 110. Precursor streams 108 and 110 are then transported into reactor 120. Retroreflective assemblies in stream 12 are introduced into reactor 114 and encapsulated retroreflective elements 10 removed therefrom.

Precursor flow rates are adjusted to provide an adequate deposition rate and to provide an oxide coating of desired quality and character. Flow rates are adjusted such that the ratios of precursor materials present in the reactor chamber promote oxide deposition at the surface of the retroreflective assemblies with minimal formation of discrete, i.e., free floating, oxide particles, elsewhere in the chamber. For example, when depositing coatings of titania from titanium tetrachloride and water, a ratio of between about eight water molecules per each titanium tetrachloride molecule to one water molecule per two titanium tetrachloride molecule is generally suitable, with about two water molecules per titanium tetrachloride molecule being preferred. Under these conditions there is sufficient water to react with most of the titanium tetrachloride and most of the water is adsorbed into the coating on the surface of the retroreflective element. Much higher ratios would tend to yield substantial quantities of unabsorbed water that might result in formation of oxide particulates rather than the desired oxide coatings. Undesirably high levels of hydroxyls or hydration and reduced chemical durability could also result. Very low ratios might tend to result in low coating rates, a large fraction of unreacted titanium tetrachloride, and increased chloride levels in the coating.

Optimum flow rates for a particular application typically depend in part upon the temperature within the reaction chamber, the temperature of the precursor streams, the degree of assembly agitation within the chamber, and the particular precursors being used, but useful flow rates may be readily determined with trial and error. In preferred embodiments, the flow rate of carrier gas used to transport the precursor materials to the reaction chamber is sufficient to agitate the retroreflective assemblies as desired and also transport optimal quantities of precursor materials to the chamber, thereby conveniently and efficiently meeting those functions.

Preferably, the precursor materials have sufficiently high vapor pressures that sufficient quantities of precursor material will be transported into the reactor for the hydrolysis reaction and coating process to proceed at a conveniently fast rate. For instance, precursor materials having higher vapor pressures will typically provide faster deposition rates than will precursor materials having lower vapor pressures, thereby enabling the use of shorter encapsulation times. Precursor sources may be heated to increase the vapor pressure of the material, however, this may necessitate heating of tubing or other means used to transport the precursor material to the reactor so as to prevent condensation between the source and the reactor. In many instances, precursor materials will be in the form of neat liquids at room temperature. In some instances, the precursor materials may be available as sublimable solids.

Precursor materials that are capable of forming dense oxide coatings via hydrolysis reactions at temperatures below about 300° C., and typically below about 200° C., are preferred for retroreflective assemblies comprising glass optical bodies and aluminum reflective members. One of the surprising features of the invention is that it has been observed that the chloride ions do not degrade aluminum reflective members during the coating process. Some polymeric materials used in retroreflective assemblies such as polycarbonate are relatively tougher than others and will withstand the coating conditions more effectively than other polymeric materials, e.g., polyester. Advantageous results have been obtained with titanium tetrachloride and/or silicon tetrachloride, and water as precursor materials. In addition to volatile metal chlorides, useful results are also expected with metal alkoxides such as titanium isopropoxide, silicon ethoxide, and zirconium n-propoxide, metal alkyls such as trimethyl aluminum and diethyl zinc, and precursors with combinations of these and other ligands or leaving groups. It may be desirable to utilize several precursors simultaneously in a coating process.

Preferably, mutually reactive precursor materials, e.g., $TiCl_4$ and $H_2O$, are not mixed prior to being added to the reactor in order to prevent premature reaction within the transport system. Accordingly, multiple gas streams into the reactor chamber are typically provided.

The reactor chamber is maintained at a temperature suitable to promote effective deposition and formation of a protective coating with desired properties on the retroreflective members. In general, increasing the temperature at which the vapor deposition process is conducted will tend to cause the reaction to proceed more quickly and will yield a resultant coating that is more dense and retains fewer fugitive unreacted precursors, but will also tend to increase the tendency of the retroreflective assembly to degrade. For example, sputtering or plasma-assisted chemical vapor deposition processes often require minimal heating of the article being coated, but require vacuum systems and can be difficult to use when coating particulate materials such as small glass microspheres. Higher pressure, e.g., operating at atmospheric pressure or higher, chemical vapor deposition processes generally must operate at a temperature sufficiently high to thermally decompose the precursor materials or to promote rapid chemical reaction of the precursor materials and volatilization of fugitive products that may degrade the coating or some member of the retroreflective assembly, e.g., attack an aluminum reflective member. Generally, the properties of the resultant coating, e.g., density, crystallinity, etc., also depend on the deposition temperature.

Retroreflective assemblies comprising metal coatings on glass optical bodies may be subject to partial oxidation of the metal or reaction or diffusion at the glass-metal interface at temperatures of 300° C. or more. Retroreflective assemblies comprising polymeric components could be subject to melting, deformation, or other degradation at significantly lower temperatures. Accordingly, an encapsulation process that operates at a temperature low enough not to undesirably degrade the retroreflective assembly and its component elements should be selected. Thus, encapsulation is preferably achieved using a hydrolysis-based APCVD process at temperatures below about 300° C., and sometimes preferably below about 200° C.. Coatings formed in such processes can provide a surprising degree of hermeticity and chemical durability, while nearly completely preserving the optical properties of the retroreflective assembly. Titania and titania-silica coatings deposited from tetrachlorides are particularly durable, hermetic, and easily deposited at low temperatures, e.g., between about 120° C. and about 160° C.. The preferred range for other precursor materials such as metal alkoxides and metal alkyls might be higher because such precursors do not generate corrosive byproducts during deposition reaction. Pure silica coatings can be deposited at lower temperatures, e.g., room temperature, with some compromise in hermeticity. Use of exceedingly low temperatures might tend to result in incomplete reaction of precursor materials and/or lower coating densities, thereby yielding less effective encapsulatory coatings. Use of exceedingly high temperatures might tend to result in undesirable reactions between reaction products such as hydrochloride and components of the retroreflective assembly, e.g., a metal reflective layer or polymeric optical body.

In one illustrative embodiment, the temperature of the reactor is maintained at between about 100° C. and about 180° C., and preferably between about 130° C. and about 150° C. when using titanium tetrachloride and silicon tetrachloride and water as precursors. It has been observed that encapsulation processes performed at temperatures within this range provide deposition of coatings that provide desired protection to the retroreflective elements while avoiding intrinsic thermal damage or adverse thermochemical reactions at the surfaces of the assemblies which cause undesirable loss of retroreflective brightness. Encapsulation processes which are performed at temperatures which are too low may tend to result coatings which do not provide desired resistance to corrosion. Such coatings may not be sufficiently protective, a result it is believed of having a more open or more hydrated structure. Encapsulation processes which are performed at temperatures which are too high may result in degradation of the optical body or specularly reflective member.

Figure 2:
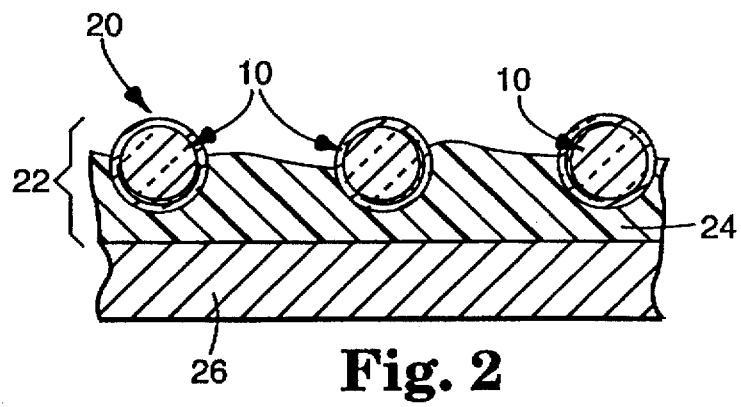
FIG. 2 is a cross-sectional illustration of a portion of a reflectorized fabric or substrate of the invention.

FIG. 2 shows an illustrative article 20 of the invention wherein retroreflective coating 22 comprising encapsulated retroreflective elements 10 in binder material 24 on substrate 26, e.g., a fabric. As a result of this invention, article 20 will exhibit improved laundering durability and resistance to harsh conditions, e.g., acid rain.

Figure 3:
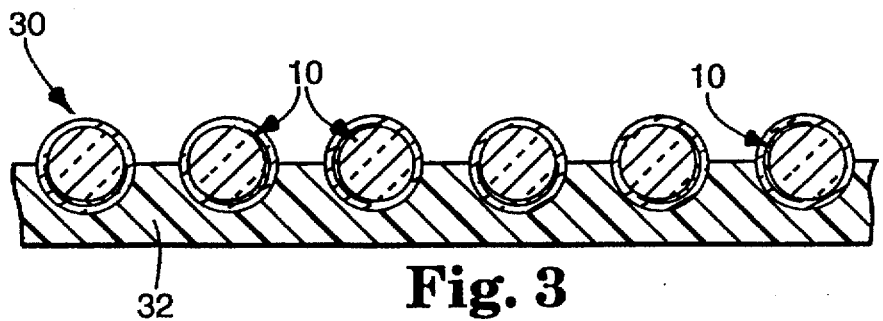
FIG. 3 is a cross-sectional illustration of a portion of a retroreflective sheeting of the invention.

FIG. 3 shows an illustrative exposed-lens retroreflective sheeting 30 of the invention wherein sheeting 30 comprises a monolayer of encapsulated retroreflective elements 10 partially embedded in and protruding from the front side of binder layer 32. In some embodiments an adhesive layer (not shown) may be provided on the rear side of binder layer 32. As will be understood, encapsulated retroreflective elements 10 of the invention may be used in a variety of known embodiments of retroreflective sheetings, etc.

EXAMPLES

The invention will be further explained by the following illustrative examples which are intended to be nonlimiting.

Unless otherwise indicated, all amounts are expressed in parts by weight. Flow rates refer to the metered volume of carrier gas (nitrogen gas) through aqueous liquid solutions of the indicated precursors.

Encapsulation Process For Samples 1–7 And C

Fluidized bed reactors consisting of glass-frit type funnels with a single bottom inlet and size D frit were used. As indicated below, 30 millimeter diameter, 25 centimeter tall, reactors modified for oil bath immersion or for heating with nichrome wire were used. The reactors were used with a single gas inlet tube. The gas inlet tubes were glass tubes, 10 millimeters in diameter, with size C glass frits which were inserted into the fluidized bed extending from the top of the funnel to introduce carrier gas and metal tetrachloride vapors into the reaction zone. A separate tube was connected to the bottom of the reactor and water vapor introduced into the reactor therethrough. Bubbler sizes were about 800 milliliters.

Nitrogen carrier gas and water vapor were passed through the funnel frit supporting the reflective assemblies. Reagent grade neat liquids of titanium tetrachloride and silicon tetrachloride from Aldrich Chemical Company were used as indicated. Fifty (50) gram batches of reflective assemblies were used.

Several different samples of encapsulated retroreflective elements of the invention were prepared using the following conditions and coating precursor materials (the flow of nitrogen carrier gas through the bubblers indicated in centimeters$^3$/minute and residence time in reactor in minutes):

| Sample | Water | TiCl$_4$ | SiCl$_4$ | Time |
|---|---|---|---|---|
| 1 | 180 | 310 | 0 | 90 |
| 2 | 280 | 220 | 40 | 90 |
| 3 | 280 | 220 | 40 | 90 |
| 4 | 280 | 220 | 40 | 40 |
| 5 | 280 | 220 | 40 | 40 |

Sample 1 was prepared at 125° C. and Samples 2–5 were prepared at 130° C. The microspheres in Samples 1, 2, and 4 were hemispherically coated with aluminum. The microspheres in Samples 3 and 5 were similar and were similarly coated with aluminum, but were treated prior to encapsulation in accordance with U.S. Pat. No. 3,535,019.

In Sample 6, 60 grams of microspheres with hemispheric aluminum coatings were encapsulated with alumina using precursor flows of 480 centimeters$^3$/minute of nitrogen carrier through water and 160 centimeters$^3$/minute through liquid aqueous solution of trimethyl aluminum, encapsulating at 140° C. for 180 minutes.

In Sample 7, 60 grams of microspheres with hemispheric aluminum coatings were encapsulated with silica using precursor flows of 500 centimeters$^3$/minute of nitrogen carrier through water, 50 centimeters$^3$/minute through liquid aqueous solution of silicon tetrachloride, and 250 centimeters$^3$/minute through liquid aqueous solution of silicon tetraethoxide, encapsulating at 50° C. for 180 minutes.

In Comparative Sample C, 60 grams of microspheres with hemispheric aluminum coatings were encapsulated with zinc oxide precursor flows of 480 centimeters$^3$/minute of nitrogen carrier through water and 160 centimeters$^3$/minute through liquid aqueous solution of diethyl zinc, encapsulating at 140° C. for 180 minutes.

Comparative Samples A and B

In Comparative Sample A, the assemblies were used without being encapsulated.

In Comparative Sample B, the assemblies were treated in accordance with U.S. Pat. No 3,535,019.

Coefficient of Retroreflection

The coefficients of retroreflection of indicated batches of retroreflective elements were measured at a −4° entrance angle and 0.2° observation angle. A patch of microspheres with no hemispheric coating was observed to have a coefficient of retroreflection of about 20 candela/lux/meter$^2$.

Example 1

To make a retroreflective coating composition, 21 parts of each indicated retroreflective assemblies were mixed with 76 parts of an ink composition having the following formulation:

| Parts | Component |
|---|---|
| 5229 | Water; |
| 59 | CARBOPOL ™ 940, a thickener from B.F. Goodrich; |
| 15 | Ammonium nitrate; |
| 14 | FOAMASTER ™ DF-160-L, antifoamant from Henkel Process Chemicals; |
| 2746 | RHOPLEX ™, an acrylic latex resin from Rohm and Haas; |
| 29 | ACRYSOL ™ ASE-60, a thickener for RHOPLEX ™ from Rohm and Haas; |
| 75 | AMICAL FLOWABLE ™ ABG-8001, a flow agent from Abbott Laboratories, Inc.; |
| 1810 | Black pigment cluster particles as disclosed in U.S. Pat. No. 3,251,704 (Nellessen); | and sufficient ammonium hydroxide to adjust the pH to about 7.

The storage stability of each sample was evaluated by measuring the coefficient of retroreflection of the assemblies after the indicated periods of time. Samples of retroreflective elements were removed from the batches and rinsed several times with water to remove the ink base and then dried at 70° C. and then the retroreflective brightness evaluated.

| | Brightness (Candela/lux/meter$^2$) | | |
|---|---|---|---|
| Days | A | B | 1 |
| Initial | 97 | 86 | 81 |
| 7 | 18 | NT | NT |
| 26 | NT | 22 | NT |
| 32 | NT | NT | 78 |
| 577 | NT | NT | 62 |

NT = not tested

After 577 days, the encapsulated retroreflective elements of Sample 1 retained about 75 percent of their initial retroreflection and the aluminum hemispheric reflective coating was still visible. The coating composition had dried out due to opening and closing of the container for observation during the test. After 7 days the retroreflective elements of Comparative Sample A had a white appearance with no aluminum hemispheric reflector being visible to the unaided eye, and had a coefficient of retroreflection about equal to that of microspheres without any hemispheric reflector. After 26 days the retroreflective elements of Comparative Sample B had a white appearance with no aluminum hemispheric reflector being visible to the unaided eye, and had a coefficient of retroreflection about equal to that of microspheres without any hemispheric reflector.

Example 2

The durability of retroreflective elements from Samples 1–5 and A were evaluated by placing 3 grams of the indicated sample in 5 grams of deionized water in a vial and allowing them to sit for 16 hours at room temperature. The samples were then placed in an oven at 150° C. and boiled to dryness. The initial retroreflective brightness (i.e., coefficient of retroreflection) of each sample (in candela/lux/meter$^2$) and the percent of its initial brightness retained after the test was as follows:

| Sample | Initial Brightness | Percent Retained Brightness |
|---|---|---|
| A | 97 | 21 |
| 1 | 81 | 102 |
| 2 | 99 | 95 |
| 3 | 83 | 99 |
| 4 | 105 | 89 |
| 5 | 85 | 93 |

Each of the samples of encapsulated retroreflective elements made in accordance with the invention retained a very high portion of its initial brightness indicating the hemispheric aluminum reflective coatings were effectively protected.

Example 3

The durability of encapsulated retroreflective elements from Sample 1 was evaluated by placing 30 grams of encapsulated retroreflective elements and boiling under reflux. Samples of microspheres were periodically removed and dried at 150° C. The percent of initial brightness of the encapsulated retroreflective elements was as follows:

| Hours | Percent Retained Brightness |
|---|---|
| 0 | 100 |
| 14 | 102 |
| 330 | 72 |

Example 4

The durability of retroreflective elements from Samples 1–5 and A were evaluated by aging the elements in a 5 weight percent aqueous solution of NaOH or 5 weight percent aqueous solution of concentrated HCl (i.e., about 37 weight percent) for 30 minutes. The following results were obtained:

| Sample | Solution | Percent Retained Brightness |
|---|---|---|
| A | NaOH | 13 |
| A | HCl | 16 |
| 1 | NaOH | 99 |
| 1 | HCl | 98 |
| 2 | NaOH | 90 |
| 2 | HCl | 89 |
| 3 | NaOH | 95 |
| 3 | HCl | 99 |
| 4 | NaOH | 90 |
| 4 | HCl | 90 |

-continued

| Sample | Solution | Percent Retained Brightness |
|--------|----------|------------------------------|
| 5 | NaOH | 96 |
| 5 | HCl | 95 |

Example 5

The durability of retroreflective elements from Samples 1, 6, 7 and Comparative Samples A–C were evaluated by placing 5 grams of the indicated elements into 5 grams of a 0.01 molar aqueous borax (i.e., $Na_2B_4O_7$) solution at room temperature in a sealed vial. The vials were then placed in a preheated oven at 65° C. (150° F.) and observed periodically. The length of time (in hours) required for loss of the metallic appearance, indicating degradation of the hemispheric aluminum coating on the microspheres, was observed as follows:

| Sample | Time |
|--------|------|
| 1 | >48 |
| 6 | 23 |
| 7 | >48 |
| A | 2 |
| B | 5 |
| C | 2 |

After 48 hours, Samples 1 and 7 still retained a shiny appearance and the test was discontinued. All three of the samples of encapsulated retroreflective elements of the invention exhibited much greater durability than the comparative example elements.

Various modifications and alterations of this invention will become apparent to those skilled in the art without departing from the scope and spirit of this invention.

What is claimed is:

1. An encapsulated retroreflective element comprising a retroreflective assembly that comprises a transparent optical body and a reflective member wherein said retroreflective assembly is essentially completely encapsulated within a dense substantially transparent oxide coating.

2. The retroreflective element of claim 1 wherein said coating is one of the following: titanium dioxide, silicon dioxide, aluminum oxide, tin oxide, or zirconium dioxide.

3. The retroreflective element of claim 1 wherein said coating is one of the following: titanium dioxide, silicon dioxide, or a combination of titanium dioxide and silicon dioxide.

4. The retroreflective element of claim 1 wherein said coating is between about 100 and about 10,000 Angstroms thick.

5. The retroreflective element of claim 1 wherein said coating is between about 300 and about 5000 Angstroms thick.

6. The retroreflective element of claim 1 wherein said optical body is substantially colorless.

7. The retroreflective element of claim 1 wherein said optical body is colored.

8. The retroreflective element of claim 1 wherein said optical body is a microsphere.

9. The retroreflective element of claim 8 wherein said microsphere is glass.

10. The retroreflective element of claim 1 wherein said optical body is a gloguide.

11. The retroreflective element of claim 1 wherein said optical body is a cube-corner element.

12. The retroreflective element of claim 1 wherein said reflective member comprises at least one of aluminum or silver.

13. The retroreflective element of claim 1 wherein said reflective member comprises dielectric reflectors.

14. The retroreflective element of claim 1 wherein said reflective member comprises reflective pigments.

15. An article having a retroreflective coating thereon, said coating comprising a plurality of encapsulated retroreflective elements of claim 1 on a substrate.

16. The article of claim 15 wherein said coating further comprises pigment particles.

17. The article of claim 15 wherein said substrate is a fabric.

18. A retroreflective sheeting comprising a monolayer of encapsulated retroreflective elements of claim 1 at least partially embedded in a binder layer.

19. The retroreflective sheeting of claim 18 wherein said retroreflective elements protrude from said binder layer and have an air interface.

* * * * *